March 6, 1951 — R. CADWALLADER — 2,544,525
VEHICLE BODY CONSTRUCTION
Filed June 2, 1945 — 3 Sheets-Sheet 1
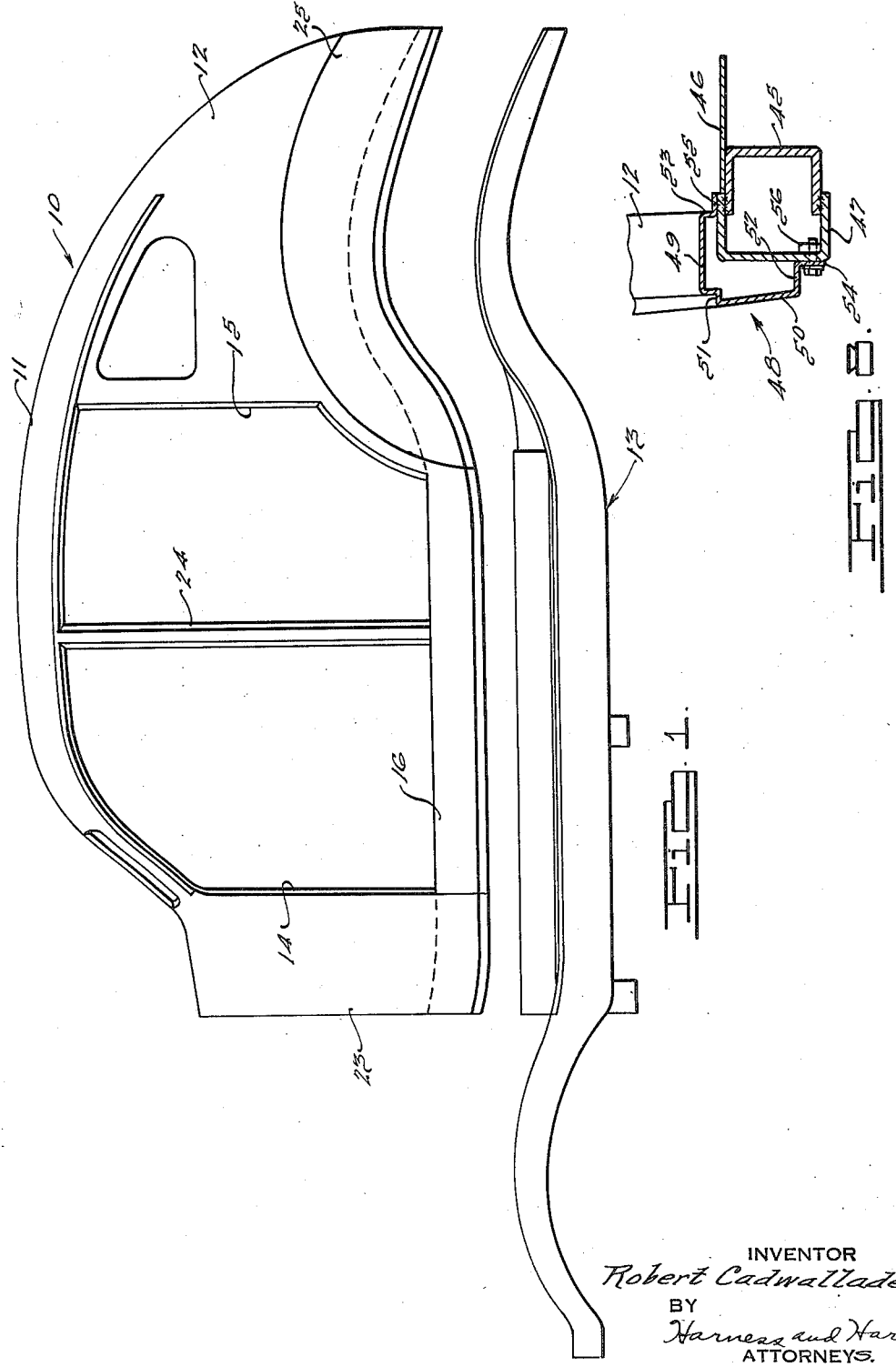
INVENTOR
Robert Cadwallader.
BY Harness and Harris
ATTORNEYS.

March 6, 1951 R. CADWALLADER 2,544,525
VEHICLE BODY CONSTRUCTION
Filed June 2, 1945 3 Sheets-Sheet 2
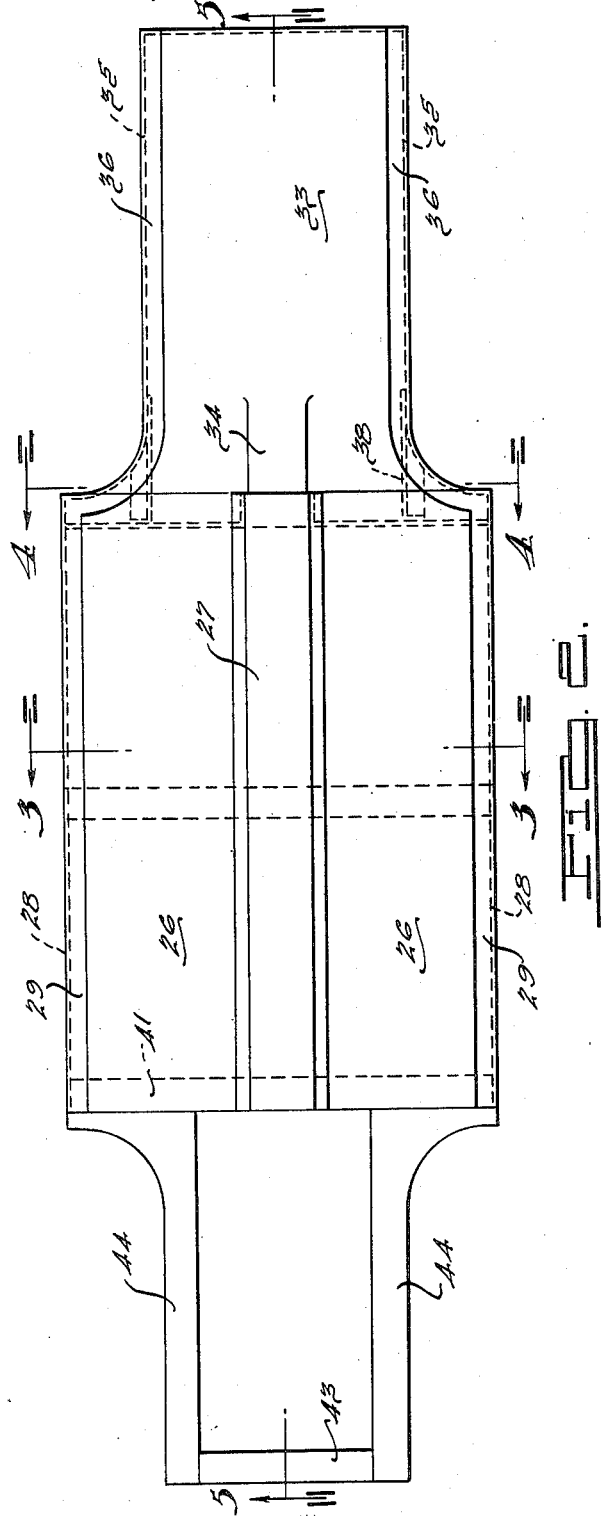
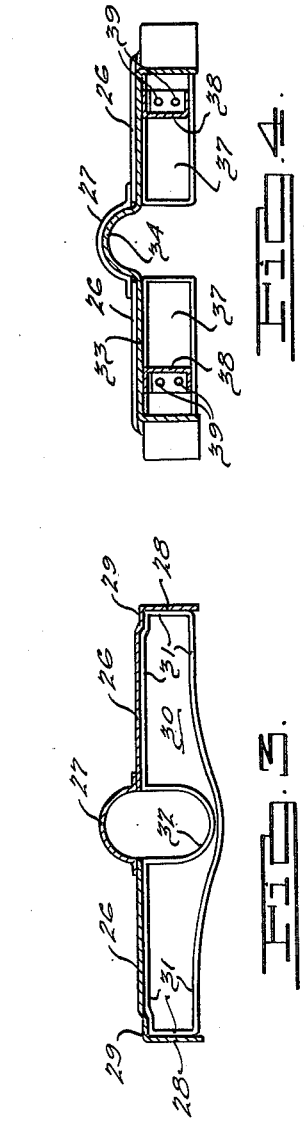
INVENTOR
Robert Cadwallader.
BY
Harness and Harris
ATTORNEYS.

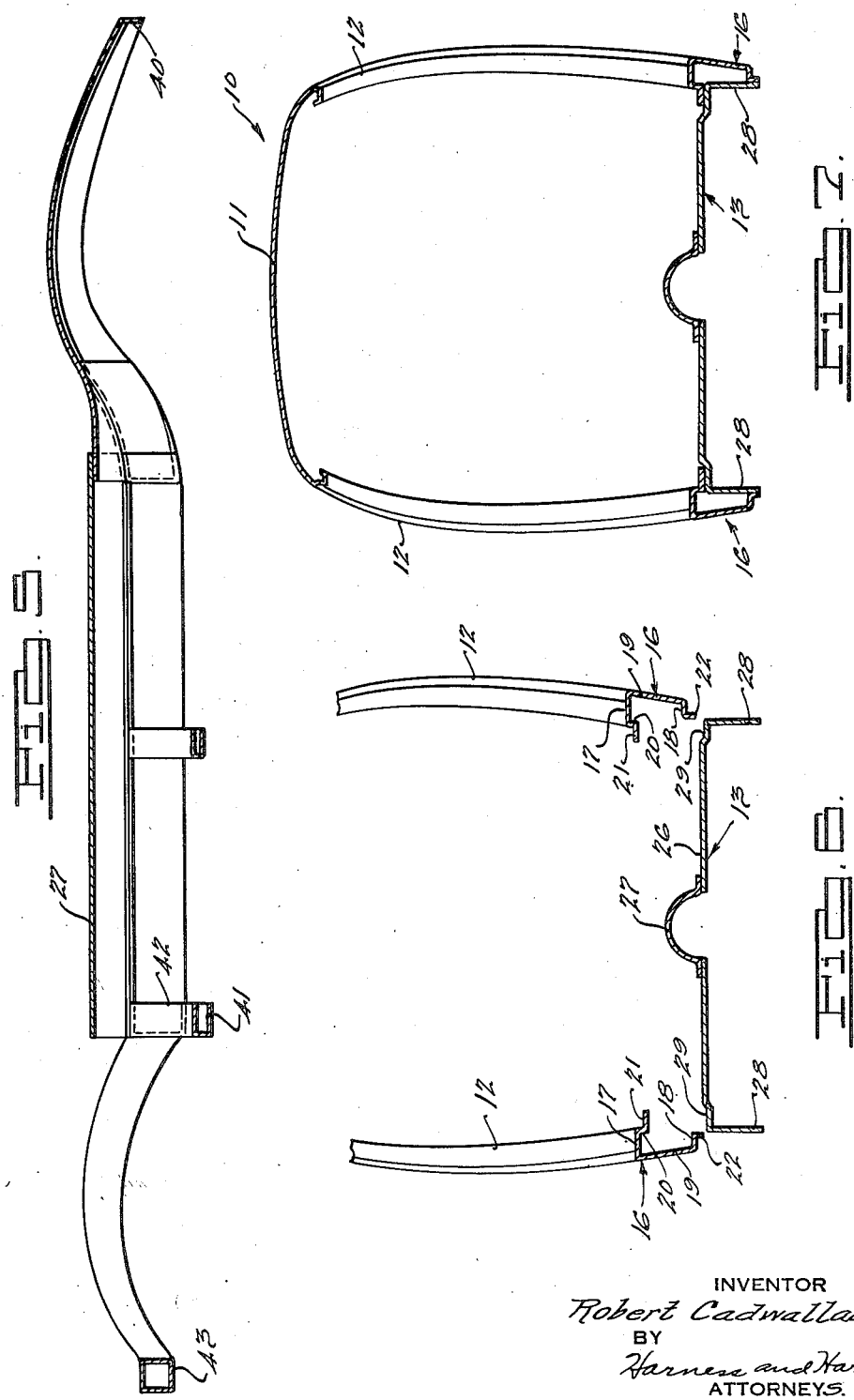

Patented Mar. 6, 1951

2,544,525

UNITED STATES PATENT OFFICE 2,544,525

VEHICLE BODY CONSTRUCTION

Robert Cadwallader, Detroit, Mich., assignor to Chrysler Corporation, Highland Park, Mich., a corporation of Delaware Application June 2, 1945, Serial No. 597,332

2 Claims. (Cl. 296—28)

This application relates to a vehicle body construction. More specifically it involves the joining of a vehicle body floor to vehicle sides and roof.

An object of the present invention is to provide an improved vehicle body construction involving a floor and sides and a top. Provision is made for the joining of these various parts in such a way that they provide their own reinforcement and separate strengthening by means of special beams is not required.

Another object is to provide an improved method of assembling parts of a vehicle body. The assembly of the parts may result in the formation of reinforcing means as part of the vehicle body.

Other objects will appear from the disclosure.

In the drawing:

Fig. 1 is a side view of parts of a vehicle body in position for assembly;

Fig. 2 is a plan view of a vehicle floor;

Figs. 3, 4, and 5 are sectional views taken on the lines 3—3, 4—4, and 5—5, respectively, of Fig. 2;

Fig. 6 is a transverse vertical sectional view through the parts of a vehicle body just prior to assembly;

Fig. 7 is a similar sectional view just after assembly; and

Fig. 8 is a sectional view of a portion of a vehicle body of modified form.

The reference character 10 designates a U-shaped assembly composed of a roof 11 and sides 12, and the reference character 13, a floor.

As seen in Fig. 1, the U-shaped assembly 10 extends from what is to be the very rear end of the vehicle up to what will be the engine compartment. There is to be a separate hood, not shown, for the engine. There are openings 14 and 15 in the sides 12 for front and rear doors, not shown. At the lower edges of the sides 12 are provided partial tubular members 16, which are of generally rectangular shape and have two parallel sides 17 and 18 extending from a third side 19 and a partial fourth 20 extending from the side 17. There are a flange 21 on the partial side 20 and a flange 22 on the side 18. Each tubular member 16 extends the entire length of the U-shaped assembly 11, the front end of the member being bonded to portion 23 of the side 12, which portion is forward of the front door opening 14. A door pillar 24 is joined at its lower end to the member 16 and at its upper end to the roof 11. The rear end of the member 16 is bonded to a section 25 forming a rear wheel well. This section is set inwardly from the rear portion of the side 12 to which it is joined, and so the rear end of the tubular member 16 is laterally displaced to conform to the displacement of the section 25.

The floor 13 at the mid part includes two sheets 26 joined as by soldering or welding, by a semi-circular member 27. The sheets 26 have depending flanges 28 at their outer edges and depressed portions 29 adjacent the flanges 28. The semi-circular member 27 and the sheets 26 constitute a wide mid part of the floor 13. This part of the floor is reinforced by a transverse beam 30 having reinforcing flanges 31 at the sides and ends, by which flanges it is joined as by soldering or welding to the sheets 26 and their depending flanges 28. The beam 30 is cut away at a central portion as indicated at 32 to cooperate with the semi-circular member in providing space for a drive shaft, not shown, adapted to extend from a transmission near the front of the vehicle body to a rear axle at the rear of the body. The floor sheets 26 are flat. At the rear the floor 13 is formed of a sheet 33 bowed upward at a forward central portion, as indicated at 34. The width of the sheet 33 is less than the combined width of the sheets 26 and the semi-circular member 27. The front edge of the sheet 33 passes beneath the rear edge of the sheets 26 and member 27 in overlapping relation with respect thereto, the forward central portion 34 of the sheet being pressed upwardly with a semi-circular shape extending longitudinally to conform to the semi-circular member 27, as shown in Fig. 4. The portion of the sheet 33 passing beneath the sheets 26 and the semi-circular member 27 is depressed with respect to the remainder of the sheet 33 so as to maintain a level of continuity between the sheet 33 and the sheets 26. The sheet 33 has depending flanges 35 at its edges and adjacent depressed portions 36 corresponding to the flanges 29 and depressed portions 29 on the sheets 26. The forward part of the sheet 33 widens suddenly in curved sides so as to cause the flanges 35 and depressed portions at this part to be correspondingly curved. Reinforcing beams 37 of U-shape are secured to the under side of the portion of the sheet 33 beneath sheets 26 and extend crosswise of the floor 11 from adjacent the semi-circular member 27 to the flanges 28. They are spaced apart at the member 27 to make room for a driveshaft or torque tube. Reinforcing beam sections 38 of U-shape extend from the beams 37 into the curved parts of the flanges 35 on the sheet 33, being secured by rivets 39 to the beam 37 and by soldering or welding to the sheet 33. The rear edge of the sheet 33 has a depending flange 40, as shown in Fig. 5. A U-shaped beam 41 extends transversely across the front end of the sheets 26, being secured thereto and being depressed at a central portion as indicated at 42 beneath the U-shaped member to provide space for the driveshaft. Forward of the sheets 26 is a supporting structure adapted to carry the engine, not shown, and to be connected to the front axle, not shown. This structure comprises a transverse beam 43 of box section and longitudinal beams 44 also of box section with rear portions widening out and joined to the beam 41 and the sheets 26.

The floor 13 and the assembly 10 comprising top 11 and sides 12 are separately formed and are then brought into the relative position shown in Figs. 1 and 6. Thereupon the floor and the assembly are moved toward one another until, as shown in Fig. 7, the flanges 21 and 22 on the partial tubular members 16 engage the depressions 29 and flanges 28 on the floor 13. The flanges 21 and 22 and the depressions 29 and flanges 28 are welded to one another, and as a result, longitudinally extending hollow box-like beams are formed at the edges of the floor reinforcing the body. Similarly the flanges 21 and 22 engage and are joined to the depressions 36 and the flanges 35 of the floor sheet 33 at the rear of the body.

In the modification of Fig. 8 a U-shaped channel member 45 is secured by soldering or welding to a floor sheet 46 in such a way as to be partially beneath the edge of the sheet and to extend therebeyond. A U-shaped channel element 47 is secured in overlapping relation by soldering or welding to the U-shaped member 45 so as to form therewith a reinforcing longitudinal box-like beam at the edge of the floor. The U-shaped element 47 is engaged by an open hollow angle member 48 of partially tubular rectangular shape, which has two adjacent legs 49 and 50 with a groove 51 at their juncture and two partial legs 52 and 53 having flanges 54 and 55. The flange 55 is welded or soldered to a leg of the U-shaped element 47, and the flange 54 is bolted to the base of the U-shaped element 47 as indicated at 56. As in the case of the construction of Figs. 1, 6, and 7, the modified form shown in Fig. 8 is employed at both sides of the vehicle and runs the length of the vehicle body to the extent that the tubular member 16 does. The open hollow member 48 are part of the U-shaped assembly 10, which also includes the top 11 and the sides 12. The manner of assembly may be as shown in Fig. 6; i. e., the assembly with the open hollow members 48 is brought toward the floor 46 with the U-shaped channels 45 and 47 attached until the flanges 54 and 55 of the open hollow member 48 contact the U-shaped channels 47. Thereupon the contacting parts are joined in the manner indicated.

I claim:

1. A vehicle body construction comprising a floor sheet, U-shaped members one at each side of the floor sheet, each member being positioned partially beneath an edge of the floor sheet and partially beyond the edge and facing outwardly of the floor with one leg engaging the sheet and one leg spaced from and below the floor sheet, a pair of U-shaped elements having legs engaging the legs of the U-shaped member in the region beyond said edges in overlapping relation so as to form hollow beams at said edges of the floor sheet, means joining the U-shaped elements to the U-shaped members, a structure shaped as a U having a base forming the vehicle-body top, legs forming the vehicle-body sides, and open hollow members secured to and extending along the ends of the legs, each hollow member having one edge adapted to lie along a said hollow beam adjacent the base of the U-shaped element thereof, and a stop-providing edge overlapping the hollow beam such as to engage the upper surface thereof along a leg of the U-shaped element, thereby providing for the said one edge and U-shaped element base to be vertically located respecting one another upon establishment of correlated positions as between the hollow member and hollow beam, means securing said one edge of each hollow member to the base of the U-shaped element, and means securing the stop-providing edge of each hollow-member to the said leg of the U-shaped element, the U-shaped elements and the hollow members forming tubular beams reinforcing the vehicle-body construction.

2. A vehicle-body construction comprising a floor, U-shaped members one at each side of the floor sheet, each member being secured to and positioned partially beneath an edge of the floor and partially beyond the edge and facing outwardly of the floor with one leg engaging the floor and one leg spaced from and below the floor, a pair of U-shaped elements having legs secured to the legs of the U-shaped members so as to form hollow beams at the edges of the floor, a structure shaped as a U having a base forming the vehicle-body top, legs forming the vehicle body sides, and angle members at the ends of the legs adapted to lie along the hollow beams in a manner such as to have certain edges adjacent the bases of the U-shaped elements and stop-forming edges engagingly overlapping the upper surface of the hollow beams provided by the upper legs of U-shaped elements, engagement of the latter edges with the upper surface of the hollow beams thereby serving to pre-establish the vertical location of the said certain edges relative to the U-shaped element upon assumption by the angle members of a correlated position respecting the hollow beams, and means securing the angle members to the upper legs and bases of the U-shaped elements, the U-shaped elements and the angle members forming tubular beams reinforcing the vehicle-body construction.

ROBERT CADWALLADER.

REFERENCES CITED

The following references are of record in the file of this patent:

UNITED STATES PATENTS

| Number | Name | Date |
| --- | --- | --- |
| 1,541,803 | Evans | June 16, 1925 |
| 2,012,057 | Swallow | Aug. 20, 1935 |
| 2,072,044 | Widman et al. | Feb. 23, 1937 |
| 2,102,402 | Zeder | Dec. 14, 1937 |
| 2,119,193 | Avery | May 31, 1938 |
| 2,173,525 | Wallace | Sept. 19, 1939 |
| 2,188,267 | Ledwinka et al. | Jan. 23, 1940 |
| 2,234,781 | Schjolin | Mar. 11, 1941 |
| 2,242,269 | Siebler | May 20, 1941 |
| 2,271,310 | Schafer | Jan. 27, 1942 |
| 2,289,395 | Ulrich | July 14, 1942 |
| 2,289,470 | Vincent | July 14, 1942 |
| 2,362,077 | Ledwinka et al. | Nov. 7, 1944 |

FOREIGN PATENTS

| Number | Country | Date |
| --- | --- | --- |
| 852,494 | France | Oct. 30, 1939 |

Certificate of Correction

Patent No. 2,544,525 March 6, 1951

ROBERT CADWALLADER

It is hereby certified that error appears in the printed specification of the above numbered patent requiring correction as follows:

Column 3, line 71, for the word "member" read *members*;

and that the said Letters Patent should be read as corrected above, so that the same may conform to the record of the case in the Patent Office.

Signed and sealed this 8th day of May, A. D. 1951.

[SEAL]

THOMAS F. MURPHY,
*Assistant Commissioner of Patents.*